UNITED STATES PATENT OFFICE.

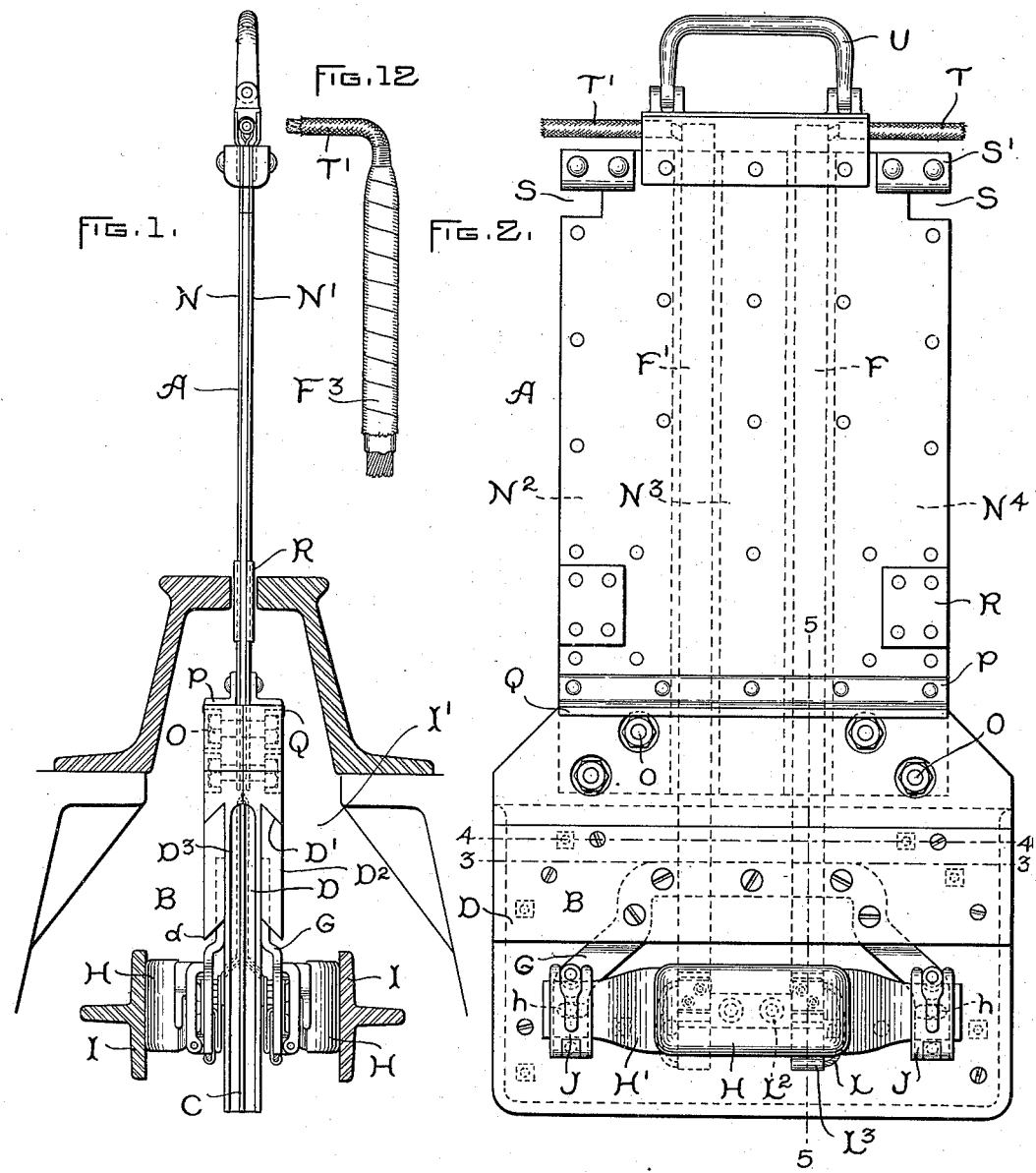

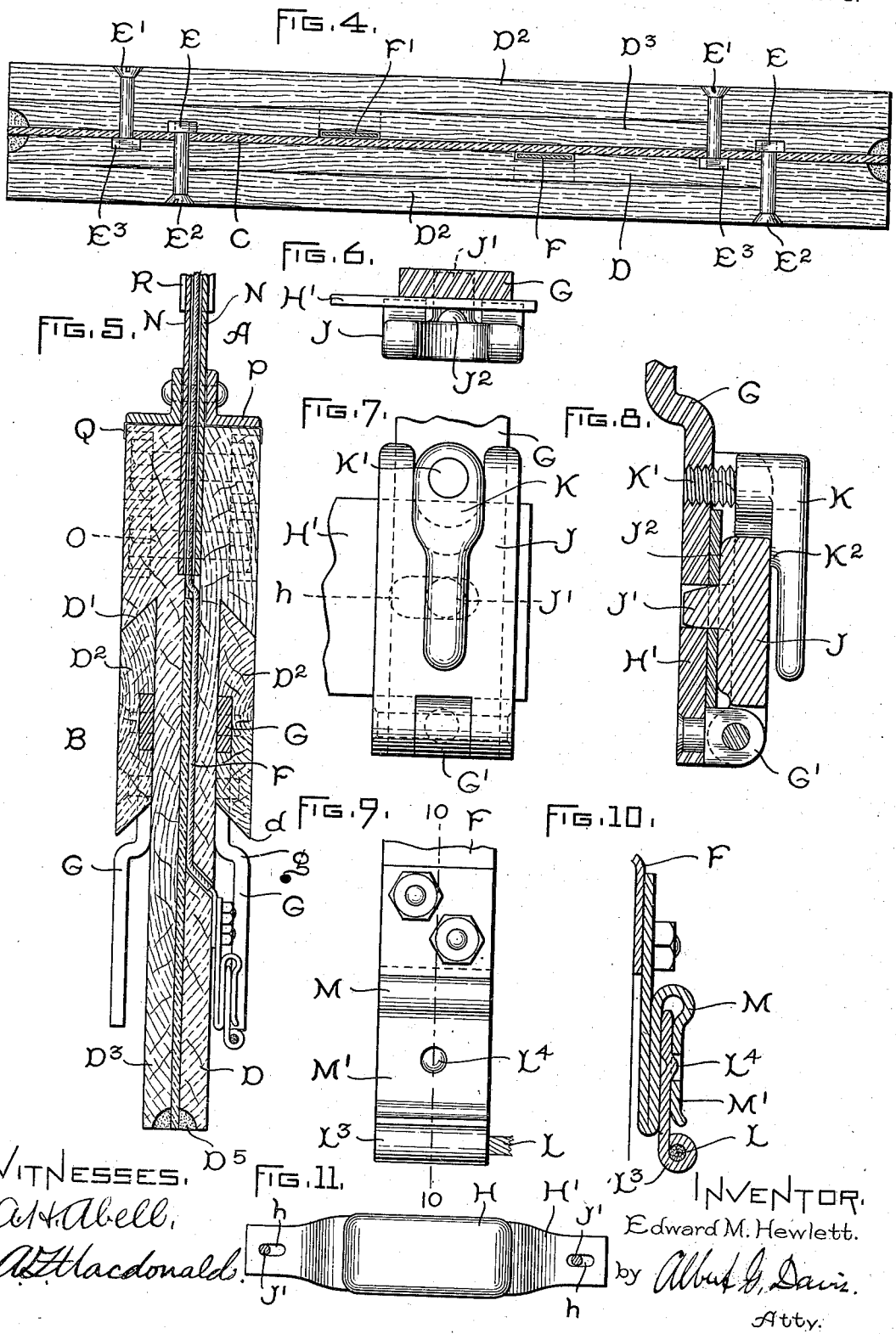

EDWARD M. HEWLETT, OF SCHENECTADY, NEW YORK, ASSIGNOR TO THE GENERAL ELECTRIC COMPANY, OF NEW YORK.

CONDUIT-PLOW.

SPECIFICATION forming part of Letters Patent No. 639,235, dated December 19, 1899.

Application filed January 29, 1898. Serial No. 668,400. (No model.)

*To all whom it may concern:*

Be it known that I, EDWARD M. HEWLETT, a citizen of the United States, residing at Schenectady, in the county of Schenectady, State of New York, have invented certain new and useful Improvements in Conduit-Plows, (Case No. 692,) of which the following is a specification.

My invention relates to contact devices employed in open-slot conduit-railways to establish connection between the electric conductors in the conduit and the propelling-motors on the vehicle.

The invention has for its object to provide a conduit-plow which will make a trailing or drawing contact with the line conductors and one which is light and strong and in which the conductors are thoroughly insulated from each other and the iron slot-rails.

In the accompanying drawings, which represent a specific embodiment of my invention, Figure 1 is an end elevation of my improved plow. Fig. 2 is a side elevation. Fig. 3 is a section taken on line 3 3 of Fig. 2. Fig. 4 is a cross-section taken on line 4 4 of Fig. 2. Fig. 5 is a section taken on line 5 5 of Fig. 2. Figs. 6, 7, and 8 are details of the means employed for holding the shoe. Figs. 9 and 10 are details of the detachable shoe-terminal and spring-clip. Fig. 11 is a detail view showing the trailing connection between the shoe and its support. Fig. 12 is a detail of the electrical connection employed between the plow and the vehicle.

The plow is divided mechanically on a horizontal plane into two parts, an upper and a lower. The lower part B is provided with a pair of contact-making devices and the upper part A with means for securing the plow to the moving vehicle. The plow is also divided on a vertical plane into two parts that are electrically separated, one containing the positive conductor and connected to the positive shoe, and the other containing the negative conductor and connected to the negative shoe. This arrangement greatly decreases the liability of short-circuiting between the shoes and simplifies the making of repairs, for the parts may readily be separated.

The lower part of the plow consists of a thin sheet or wall C, of some tough insulating material—as fiber, for example—and secured to each side of the sheet are flat pieces of insulating material. These pieces are cut away at D' to receive strips $D^2$, and the cut is an angular one, as shown at D', Figs. 1 and 5, so that moisture will tend to creep down the outer surface of the plow instead of working through the plow parts. The pieces of wood D and $D^3$ are grooved on the bottom and two sides, as shown at $D^5$. This has a tendency to make the moisture creep to the outer surfaces away from partition C, and as a further precaution the groove is filled with some hard grease, as indicated by $D^6$. The pieces D $D^3$ are secured to sheet C in the manner shown in Fig. 4. Assume, for example, that the piece $D^3$ is to be mounted first. It is placed in position, with nuts E mounted in openings formed in the side next the fiber sheet and secured by bolts E' and nuts $E^3$. Piece D is then mounted in position and secured by bolts $E^2$, which pass through the fiber sheet and are secured by nuts E.

Extending vertically through the plow are flat insulated conducting-strips F and F', situated on opposite sides of the fiber sheet and longitudinally displaced. By arranging the conductors with a solid wall of insulation between them all danger of short-circuiting at this point is avoided.

Strips $D^2$ are similar in construction and are provided with a beveled lower edge $d$, so arranged that moisture will collect at this point and drip down instead of working inward through the plow. The strips are grooved on their inner faces to receive the supports G for the contact-shoes.

The two similar supports G G are screwed to opposite sides of the plow-body and consist of a downwardly-extending fork provided with offsets at $g$, so that the ends will stand away from the insulating-pieces D and $D^3$.

Plows intended for use on the ordinary conduit-roads should be arranged to work equally well when traveling in either direction, and I have found that on account of inevitable slight irregularities in the electric conductor and poor joints between adjacent sections plows will operate successfully in practice only when the contact-shoes have a trailing connection with the moving vehicle—in other words, when the shoes are pulled along instead of being pushed from a point in the rear of the shoe or carried by supports extending outward at right angles to the body of the plow. To accomplish this, I mount the contact-shoes H on flat springs H', which press the shoes outward away from the plow and into engagement with the stationary line conductors I, located in the conduit I'. These springs are slotted at $h$ on their outer ends, and entering these slots are securing devices J. The relation of the parts as shown in Fig. 11 is such that the shoes are always drawn from the forward securing device, the rear slot permitting the shoe to move freely in and out as the distance between conductors I changes.

It is necessary from time to time to replace the contact-shoes. This is done in some instances while the plow is on the car, and as the car-pits are often very cold and damp it is desirable to simplify the construction of the securing devices and do away with all small parts, so that the amount of time required to shift the shoes shall be small. To accomplish this, I mount hinged holders or securing devices J, Figs. 7 and 8, on the lower ends of the forked supports G, with suitable retaining-clamps K. The securing devices are similar, and each consists of a flat piece of metal pivoted at the lower end to studs G' and provided with a pin or projection J', which passes through slot $h$ in the contact-spring and enters a hole $g'$ in the forked support. Extending across contact-spring H' is a semicircular bead $J^2$, formed on the inner surface of the securing device which holds the spring against the support. The upper end of the securing device is forked to receive the retaining-clamp K. The handle of the retaining-clamp is provided with a screw-threaded bolt K', which enters support G, and a shoulder $K^2$, which bears against the securing device and holds it in place. Electrical connection between the positive and negative shoes and vertical conductors F and F' is established by flexible cables L, which are provided with shoe-terminals L' and plow-terminals $L^3$. The shoe-terminals are permanently secured in place by screws $L^2$; but the plow-terminals are detachably secured in place. The arrangement for doing this is best shown in Figs. 5, 9, and 10, where $L^3$ represents the plow-terminal, and consists of a flat metal plate having a projection $L^4$ thereon, which enters a hole in spring-clip M and retains the terminal in place. Spring-clip M is bolted to the plow and makes electrical connection with conductor F. The clip consists of a piece of sheet metal bent back and forth on itself and provided with an outer spring-arm M', which makes contact with the cable-terminal. The cables L, in addition to carrying current between the positive and negative shoes and conductors F and F', act as fuses to interrupt the circuit. It is not intended that these cables shall take the place of the ordinary car-fuses or circuit-breakers, for they are too inconvenient to replace, but to act as an emergency circuit-interrupter, acting only in event of a prolonged short circuit, in which case it would be better to break the circuit rather than injure the plow.

To remove a contact-shoe, the handles of the retaining-clamps are rotated through one hundred and eighty degrees and the securing devices swung downward around pin $J^3$ as a center, and the shoe can be removed. It will readily be seen that the shoe can be removed without the use of tools, which in a cold wet car-pit is a great advantage.

The upper part of the plow consists of a shank made up of two steel plates N and N', with separating-plates $N^2$, $N^3$, and $N^4$. These plates are riveted together, and between them are located conductors F and F'. The shank extends into a slot formed between wooden pieces D $D^3$, and the two parts of the plow are bolted together by four transverse countersunk bolts O. The bolts are countersunk, so that they will not interfere with the operation of the plow and also that they may be better insulated by covering them with hard grease.

Angle-irons P are riveted to steel plates N and N' and rest on top of the insulation D $D^3$. These irons strengthen the plow and prevent the lower part from twisting sidewise with respect to the top. Between the angle-irons and side plates N and N' and wooden pieces D $D^3$ are thin sheets of metal Q, which extend downward over the outer face of the plow and prevent moisture from working into the central part.

At points on the front and rear ends of the plow opposite the slot-rails $I^2$ are removable wear-plates R, which protect the side of the plow.

The upper end of the plow is provided with front and rear notches S, which are adapted to engage with some stationary part of the motor-truck and support the plow. The portion of the plow above the notches is reinforced by plates S', which are slightly rounded, so that the plow may be readily mounted in place, at the same time permitting a slight rocking motion of the plow in a lateral direction.

Positive and negative leads T and T' are secured to the upper ends of conductors F and F' and form the electrical connection between the moving vehicle and the plow.

For convenience in handling the plow when detached from the vehicle a handle U is secured to the upper part of the plow.

In Fig. 12 I have shown a slight modification of my invention in which a stranded cable $F^3$ is substituted for the flat conductors F and F'. By this arrangement all joints are dispensed with and the construction simplified. In constructing this feature of my invention an ordinary round-stranded cable is employed, which is flattened at one end to permit it to pass through the shank of the plow to the contact-shoes and is left round at the other to form a connection with the vehicle.

What I claim as new, and desire to secure by Letters Patent of the United States, is—

1. In a conduit-plow, the combination of an insulating-support, positive and negative contact-shoes insulated from each other, and mounted on opposite sides of the insulating-support, forked metal supports to which the springs carrying the shoes are secured, a connection between the springs and their support, arranged so that the shoes make a trailing connection with the conduit-conductors when traveling in a forward or backward direction, and a detachable securing device for holding the springs in place.

2. In a conduit-plow, the combination of a central insulating-wall, pieces of insulating material situated on each side of the wall, and secured thereto, conductors embedded in the insulating material, but separated from each other by the insulating-wall, forked supports secured to the insulating side pieces, and contact-shoes mounted in the supports.

3. In a conduit-plow, the combination of a central insulating-wall, insulating-pieces secured to each side of the wall, having grooves formed in their outer edges, and a filling of grease in the grooves to prevent moisture from working into the body of the plow.

4. In a conduit-plow the combination of a central insulating-wall dividing the plow electrically into two parts, pieces of wood secured to the sides of the wall and provided with angular cut-away portions arranged so that moisture will be prevented from working inward, and strips of insulating material mounted in the cut-away portions, each provided with an angular lower edge to collect moisture and prevent it from working into the plow.

5. In a conduit-plow, the combination of a central insulating-wall dividing the plow electrically into two parts, pieces of wood secured on each side of the wall, and bolts for securing the pieces to the wall, the arrangement being such that the bolts extend through one side piece and the wall without passing through the opposite side piece.

6. In a conduit-plow, the combination of an insulating-support, a laterally-extending spring-pressed contact-shoe, and a securing device for the shoe comprising a hinged plate, and a clamp for securing the plate in place.

7. In a conduit-plow, the combination of a body of insulating material, a metal support secured thereto, a detachable spring-pressed contact-shoe carried by the support, and a securing device for the shoe comprising a hinged plate provided with a pin which enters a slot in the shoe-spring and forms the connection between the shoe and its support, and a clamping-handle provided with an adjustable support.

8. In a securing device for conduit-plow shoes, the combination of a metal support, a flat spring to which the contact-shoe is secured carried by the metal support, a plate hinged to the support and provided on its inner face with a pin which passes through the spring and enters a hole in the support, a bead which bears on the flat side of the spring, a clamping-handle provided with a screw-threaded support, and a shoulder on the handle which bears on the outer surface of the hinged plate and retains it in place.

9. In a conduit-plow, the combination of a support composed of two pieces of insulating material, a slot formed between the pieces at the top, steel plates extending downward into the slot, and angle-irons secured to the plate at the point where they enter the slot.

10. In a conduit-plow, the combination of an insulating-support provided with a slot in the top, steel plates extending downward into the slot, countersunk bolts extending through the plates and the support for securing them together, angle-irons secured to the plates at the point where they enter the slot, and pieces of sheet metal located between the angle-irons and the plates and insulating-support to prevent moisture from working into the interior of the plow.

11. In a conduit-plow, the combination of a contact-shoe, arranged to move with respect to its support, a cable serving as a connection and fuse between the shoes and fixed part of the plow, permanently secured to the shoe at one end and provided with a blade at the other, and a terminal mounted on the plow with which the blade engages, comprising a flat piece of metal provided with means for preventing the blade from dropping out of the terminal.

12. In a conduit-plow, the combination of an insulating central wall, pieces of wood situated on each side of the wall, strips of wood extending parallel with the central wall, cut-away portions in the inner faces of the strips, flat fork-shaped metal supports mounted in the cut-away portions of the strips, offsets in the fork-legs to separate them from the insulation, flat springs which carry the contact-shoes resting on the fork-legs, and means for detachably securing the springs to the forks.

13. The combination in a conduit-plow, with the support, of a spring with longitudinal slots, supporting-pins extending through said slots, and a contact-shoe mounted on said spring, substantially as described.

14. The combination in a conduit-plow with the support, of a contact-shoe, a spring to which said contact-shoe is secured, a holder for retaining said spring in position, and a removable clamp for said holder, substantially as described.

15. The combination in a conduit-plow with the support, of a contact-shoe, a holder for retaining said shoe in place, and a clamp for said holder, substantially as described.

16. The combination in a conduit-plow, with the support, of a contact-shoe, a forked holder for retaining said shoe in place, and a clamp for said holder, substantially as described.

17. The combination in a conduit-plow with the support, of a contact-shoe, a forked holder for retaining said shoe in place, and a clamp for said holder rotatable about a point between the branches of said holder substantially as described.

18. The combination in a conduit-plow with the support, of conductors with flexible terminals carried thereby, contact-shoes detachably mounted on said support, flexible conductor-terminals in each of said shoes, and means for detachably connecting conductors borne by one set of terminals, to the other set of terminals, substantially as described.

19. In a conduit-plow, the combination with a support, of springs adapted to conform to the varying space between the line conductors, means for mounting said springs on said support so that the springs may trail in either direction from said support, and collecting devices carried and supported by said springs.

20. The combination in a conduit-plow, with the support, of shoes detachably mounted on said support, wire leads from one of said members, and spring-clamps on the other member for engaging said wire leads.

In witness whereof I have hereunto set my hand this 22d day of January, 1898.

EDWARD M. HEWLETT.

Witnesses:
B. B. HULL,
E. W. CADY.